US012136051B2

(12) United States Patent
Calvo et al.

(10) Patent No.: US 12,136,051 B2
(45) Date of Patent: Nov. 5, 2024

(54) SYSTEM AND METHOD FOR UNDERWATER OBJECT DETECTION WITH LAW ENFORCEMENT ALERT AND EXTERNAL AGENCY NOTIFICATION

(71) Applicant: MOTOROLA SOLUTIONS, INC., Chicago, IL (US)

(72) Inventors: Christopher Calvo, Plantation, FL (US); Shivakumar Bangalore Ramu, Weston, FL (US); Daniel R Bestor, Schaumburg, IL (US); Antonio Faraone, Fort Lauderdale, FL (US); Sean Regan, Boca Raton, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 357 days.

(21) Appl. No.: 17/457,566

(22) Filed: Dec. 3, 2021

(65) Prior Publication Data
US 2023/0177417 A1 Jun. 8, 2023

(51) Int. Cl.
*G06Q 10/0631* (2023.01)
*G06Q 50/26* (2024.01)
(Continued)

(52) U.S. Cl.
CPC ....... *G06Q 10/06311* (2013.01); *G06Q 50/26* (2013.01); *G06T 7/50* (2017.01);
(Continued)

(58) Field of Classification Search
None
See application file for complete search history.

(56) References Cited

U.S. PATENT DOCUMENTS

| 9,569,959 B1 * | 2/2017 | Sprague | G08G 1/0104 |
| 11,046,271 B2 * | 6/2021 | Lerner | B60W 30/09 |

(Continued)

FOREIGN PATENT DOCUMENTS

| EP | 3432029 A1 | 1/2019 |
| KR | 102263037 B1 | 6/2021 |

OTHER PUBLICATIONS

Prasad, Dilip K., et al. "Video processing from electro-optical sensors for object detection and tracking in a maritime environment: A survey." IEEE Transactions on Intelligent Transportation Systems 18.8 (2017): 1993-2016 (Year: 2017).*

(Continued)

*Primary Examiner* — Darlene Garcia-Guerra
(74) *Attorney, Agent, or Firm* — Barbara R. Doutre

(57) ABSTRACT

A communication system and method are provided to conduct waterway searches for the detection and identification of objects and the generation of law enforcement agency alerts and pre-approved external agency notifications. A water body surveillance apparatus, under control of a law enforcement agency, surveys above and below a water surface to detect objects and collect data pertaining to the detected objects. The communication system identifies the detected object and generates an alert to the law enforcement agency identifying the object. A notification is sent to pre-approved external agencies based on object type. The pre-approved external agencies may include other law enforcement agencies different from the law enforcement agency and non-law enforcement agencies, such as pre-approved insurance agencies, and vehicle repossession companies, environmental agencies.

16 Claims, 3 Drawing Sheets

(51) Int. Cl.
  *G06T 7/50* (2017.01)
  *G06T 7/62* (2017.01)
  *G06T 7/70* (2017.01)
  *G06V 10/74* (2022.01)
  *G06V 20/05* (2022.01)
  *G06V 20/17* (2022.01)
  *G06V 20/52* (2022.01)
  *G08B 21/18* (2006.01)
  *H04Q 9/00* (2006.01)

(52) U.S. Cl.
  CPC .............. *G06T 7/62* (2017.01); *G06T 7/70* (2017.01); *G06V 10/74* (2022.01); *G06V 20/05* (2022.01); *G06V 20/17* (2022.01); *G06V 20/52* (2022.01); *G08B 21/18* (2013.01); *H04Q 9/00* (2013.01); *G06T 2207/10032* (2013.01); *G06T 2207/30232* (2013.01); *H04Q 2209/40* (2013.01)

(56) References Cited

U.S. PATENT DOCUMENTS

| | | | | |
|---|---|---|---|---|
| 11,416,542 | B1* | 8/2022 | Campbell | H04N 7/188 |
| 11,423,502 | B1* | 8/2022 | Sarpy, Sr. | G06Q 50/26 |
| 2004/0008253 | A1* | 1/2004 | Monroe | H04B 7/18506 |
| | | | | 348/E7.086 |
| 2009/0018875 | A1* | 1/2009 | Monatesti | G06Q 10/06316 |
| | | | | 705/7.42 |
| 2012/0078517 | A1 | 3/2012 | Bogucki | |
| 2014/0218217 | A1* | 8/2014 | Calvar Anton | B63C 9/08 |
| | | | | 340/984 |
| 2014/0240313 | A1* | 8/2014 | Varga | H04N 13/383 |
| | | | | 345/419 |
| 2015/0172545 | A1* | 6/2015 | Szabo | H04N 7/181 |
| | | | | 348/36 |
| 2016/0367188 | A1* | 12/2016 | Malik | G16H 40/67 |
| 2017/0180964 | A1* | 6/2017 | Mehta | H04W 12/068 |
| 2018/0239948 | A1* | 8/2018 | Rutschman | G06T 7/20 |
| 2019/0164401 | A1* | 5/2019 | Lawrence | H04W 4/029 |
| 2020/0349560 | A1* | 11/2020 | Samples | G06Q 20/384 |
| 2021/0084480 | A1* | 3/2021 | Maier | H04W 4/90 |
| 2021/0124085 | A1 | 4/2021 | Chabert et al. | |
| 2021/0327247 | A1* | 10/2021 | Lim | B63C 9/0005 |
| 2021/0383193 | A1* | 12/2021 | Navoni | G06Q 10/06 |
| 2021/0406644 | A1* | 12/2021 | Salman | G06N 3/045 |
| 2022/0342047 | A1* | 10/2022 | Moscovici | G01S 17/931 |
| 2023/0102792 | A1* | 3/2023 | Takatsuka | G01N 15/1425 |
| 2024/0103156 | A1* | 3/2024 | Bowers | G01S 13/9021 |

OTHER PUBLICATIONS

Schultz, John J., et al. "Detecting submerged objects: The application of side scan sonar to forensic contexts." Forensic science international 231.1-3 (2013): 306-316 (Year: 2013).*

Mihailovic, Andrej, et al. "Towards Augmenting Maritime Surveillance Capabilities via Deployments of Unmanned Aircrafts and Autonomous Underwater Vehicles." 14th NATO Operations and Research Conference, virtual conference. 2020 (Year: 2020).*

* cited by examiner

SYSTEM AND METHOD FOR UNDERWATER OBJECT DETECTION WITH LAW ENFORCEMENT ALERT AND EXTERNAL AGENCY NOTIFICATION

BACKGROUND

Waterways, such as canals, lakes, and other bodies of water are often relied upon to prevent or minimize community flooding, provide controlled drainage, and to preserve ecosystems. Counties or cities having numerous waterways may employ underwater law enforcement divers to search waterways for evidence of illegal activity. Dedicated dive searches may also be conducted in response to a missing person or suspicion of foul play. Human dive searches are limited by the number of qualified divers, cost, water clarity, environmental temperatures, and the like. Additionally, every year numerous waterways are subjected to illegal dumping incidents. Objects such as vehicles (stolen or purported to be stolen), tires, batteries, and other toxic materials, may be dumped. The vast number of waterways found in most county or city regions is simply too large to completely monitor via human dive searches, forcing law enforcement to typically limit waterway searches.

Accordingly, it would be desirable to provide improved technical capabilities to electronically conduct waterway searches.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
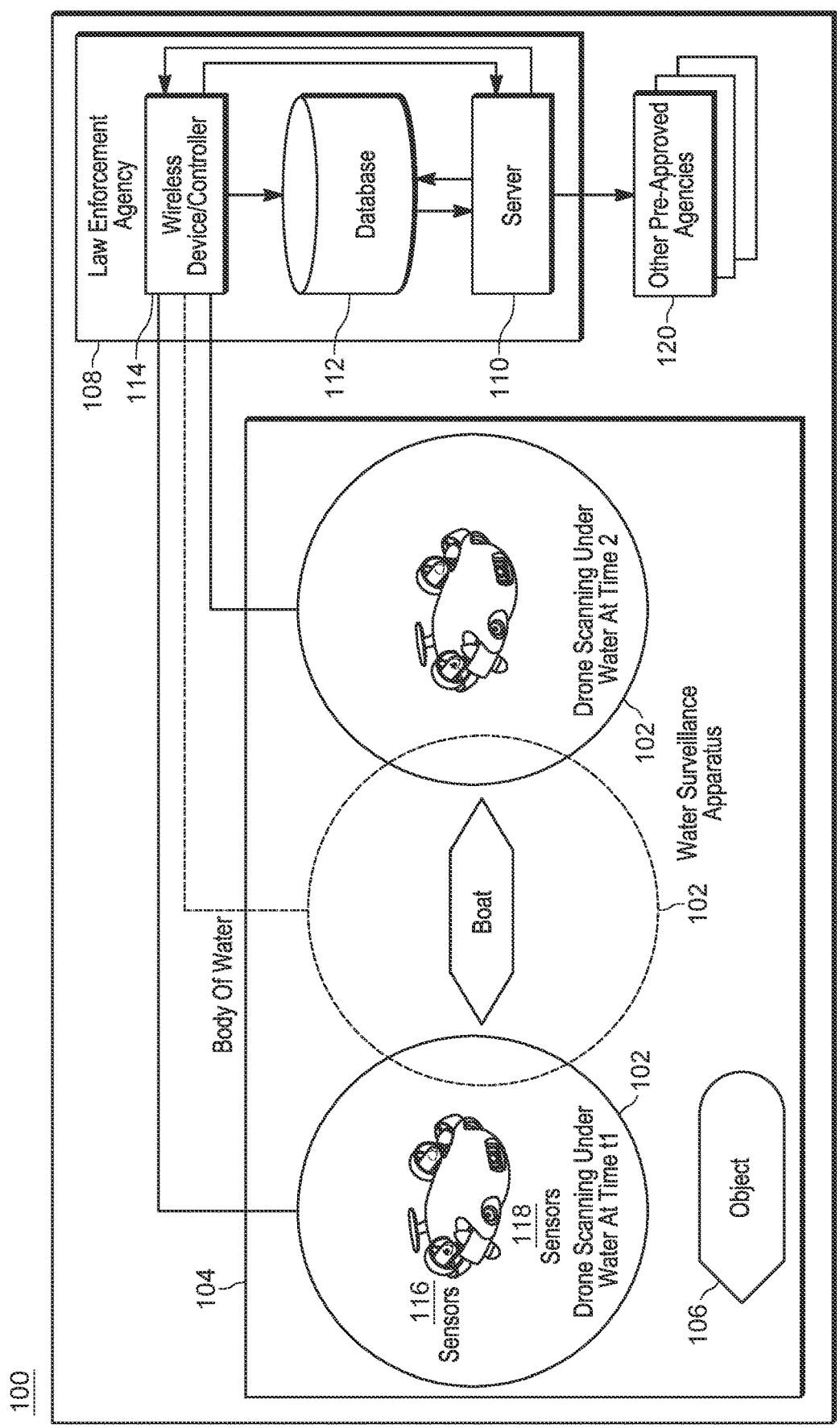
FIG. 1 is a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Briefly, there is provided herein a communication system and technical method to conduct waterway searches for the detection and identification of objects and the generation of law enforcement alerts and external agency notifications. The communication system and method detect and identify objects within a water body (i.e. body of water, such as a canal, lake, and the like) and generate alerts to a law enforcement agency and further provide notifications to pre-approved external agencies based on object type. The pre-approved external agencies may include other law enforcement agencies different from the law enforcement agency and non-law enforcement agencies. In some embodiments, the pre-approved external agencies, which are non-law enforcement agencies, may be notified as part of a paid or non-paid subscription service agreement. The notifications sent to the pre-approved external agency may be configurable to include information specific to the pre-approved external agency. The system and method provide the ability to search over a larger area and identify focused areas within which divers can focus future search efforts to improve the effectiveness of each dive search. Navigational patterns for particular search areas can be saved and optimized for future search of the same area. Patterns of dumping can be identified over time enabling predictive analytics to be used to predict potential dumping activity in order to circumvent such activity and identify offenders.

In accordance with one example embodiment, a communication system is provided which includes a water surveillance apparatus for surveying above and below a water body surface to detect objects and collect data pertaining to the detected objects, the water surveillance apparatus being under control of a law enforcement agency wireless communication device. The system further includes a server for wirelessly communicating with the wireless communication device, a database operatively coupled to the server, the database having pre-stored data stored therein pertaining to objects of interest, the database further storing the collected data pertaining to the detected object collected by the water surveillance apparatus. The server includes a processor configured to: perform machine learning and analytics to compare the collected data pertaining to the detected object to the pre-stored data to determine a match; determine the match as being one of a vehicle object, body remains (human and/or animal), or other object match; in response to the match being a vehicle and/or body remains match, the server sends an alert to the law enforcement agency to dispatch one or more dive teams to a geographic location of the match and save the location for use in a future dispatch of one or more dive teams. The server further notifies pre-approved non-law enforcement approved agencies associated with the match type of the identified match type.

In accordance with another example embodiment, a method of operating water body surveillance apparatus within a communication system is provided. The method begins with surveying, using the water body surveillance apparatus, above and below a water surface to detect objects and collect data pertaining to the detected objects, the water body surveillance apparatus being under control of a wireless communication device of a law enforcement agency; wirelessly communicating the collected data from the water body surveillance apparatus to the wireless communication device. The method continues by wirelessly communicating the collected sensor data from the wireless communication device to a database and server. Machine analytics are performed by the server, to compare the collected data pertaining to the detected object to pre-stored data of the database to determine a match. The method continues by identifying, by the server, a match type as being one of a vehicle object, body remains (human and/or animal) match, or other object of interest match associated with pre-approved external agencies. In response to the match type being a vehicle and/or body remains match, the server sends an alert to the law enforcement agency to dispatch one or more dive teams to a geographic location of the match and save the location for use in future dispatch of one or more dive teams. In response to the match type being an object of interest match, the server sends an alert to the law enforcement agency and further sends a notification to a pre-approved external agency associated with the object of interest match.

Each of the above-mentioned embodiments will be discussed in more detail below, starting with example system and device architectures of the system in which the embodiments may be practiced, followed by an illustration of processing blocks for achieving an improved technical method, device, and system for electronic underwater object detection.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures. Referring now to the drawings, and in particular FIG. 1, there is shown a communication system 100 for water body electronic surveillance, the system including a water body surveillance apparatus 102 for surveying above and below a water body surface 104 to detect object(s) 106 and collect sensor data pertaining to the detected objects, the water body surveillance apparatus being under control of a law enforcement agency 108 wireless communication device 114.

The communication system under the control of the law enforcement agency further includes a computer server 110 for wirelessly communicating with the wireless communication device 114. The communication system 100 further includes a database 112 operatively coupled to the computer server 110 and wireless communication device 114, the database further storing the collected data pertaining to the detected object collected by the water body surveillance apparatus. The operative coupling may be wired, wireless, or the database may be integrated as part of the computer server 110.

In accordance with some embodiments, the computer server 110 includes a processor configured to: perform machine analytics to compare the collected sensor data pertaining to the detected object to the pre-stored data to determine a match; identify a match type as being one of a vehicle object, body remains (human and/or animal), or other external agency object of interest match associated with pre-approved external agencies 120 outside of the law enforcement agency. In response to the match type being a vehicle and/or body remains match, the server sends an alert to the law enforcement agency to dispatch one or more dive teams to a geographic location of the match or to save the location for use in future dispatch of one or more dive teams. In response to the match type being an external agency object of interest match, the server sends an alert to the law enforcement agency and further notifies a pre-approved external agency associated with the object of interest match.

In some embodiments, the water body surveillance apparatus 102 may include a drone having above water sensors and/or below water sensors and/or a boat similarly having above water sensors and below water sensors. The above water sensors may be configured as a first group of sensors 116 operational above water for collecting above water sensor data. The below water sensors may be configured as a second group of sensors 118 operational below water to capture below water sensor data.

In accordance with some embodiments, the first group of sensors 116 and second group of sensors 118 may periodically scan zones assigned by the controller of the wireless communication device 114 to detect objects above and below the water body surface. Using data gathered by the first and second group of sensors 116, 118, estimates of object location, shape and/or volume are made and communicated to the wireless communication device 114. The sensor data pertaining to estimated object location, object shape, and/or object volume may be relayed and stored in the database 112 for future comparison. Applications running on server 110 may optionally fetch the sensor data to produce metadata that can also be stored on database 112 for future comparison. The types of sensors may include, but are not be limited to, one or more of a camera (for image scanning—for object size, shape, and/or volume data), flow rate sensor (velocity of movement), and fluid density sensor (mass flow reader useful for analyzing different types of water environments and facilitating the determination of object size, object shape and/or object movement over time). The number and type of sensors is not intended to be limiting and may further include other sensor examples such as, an accelerometer (for stabilization of the apparatus), a gyroscope (for detecting angular motion), a magnetometer (for measuring magnetic field, magnetic dipole moment, or cardinal direction), a barometer (e.g. barometric pressure sensor that measures atmospheric pressure for weather and water pressure, to facilitate determining depth of an object and depth of the apparatus under water), a GPS Sensor (for location tracking), and/or a distance sensor, a flow detector (water flow rate data, turbulence data), a sonar device (for distance and shape approximation of an object), a radar device (for distance and shape approximation of an object).

The embodiments further provide for optimizing those sensors that operate above the water body surface and those sensors operating below the water body surface. For example, a first group of sensors includes above-water type sensors 116 including, for example, one or more of: image, acoustic (microphone), magnetic, optical water turbulence, wind, and temperature type sensor, and a second group of sensors includes below-water type sensors 118 including, for example, one or more of: image, acoustic (sonar data to map the water body floor), underwater optical water turbulence, flow rate, and fluid density.

The water body surveillance apparatus 102 may initially receive navigational input and sensor instructions via the user controlled wireless communication device, such as a laptop, tablet or other wireless device under the control of the law enforcement agency. It is also envisioned that further searches over previously searched areas may be performed autonomously (or combination of user controlled and autonomous) by the water body surveillance apparatus 102 based on automated instructions derived from the server's machine learning and analytics and built-up database 112 thereby providing for an artificially intelligent system.

The wireless communication device 114 includes a controller for controlling the positioning of the drone and collection of sensor data in accordance with surveillance instructions set forth by the law enforcement agency. The wireless communication device 114 may also be located on-board of the boat or off-board of the boat, for example on some other apparatus, and/or off/shore on land to generate navigation instructions for optimal collection of sensor data. The wireless communication device may provide dedicated control of the drone and/or navigation instructions of the boat or may be part integrated as of a law enforcement portable laptop, portable radio, or tablet device or the like. Again, while user controlled wireless devices may control initial surveys, it is appreciated that further surveys taken of a body of water over time will enable autonomous searching based on automated instructions derived from the machine learning searches.

The computer server 110 may operate through a cloud based digital system to centralize all data taken over different regions and different times. Neural network technology and artificial intelligence can be used to bring the underwater data collected, including data from different sources, and aggregate it into comprehensive and understandable reports.

The database 112 may further electronically store mappings between types of objects of interest and external agencies thereby enabling the law enforcement agency to provide subscription services for non-law enforcement agencies. Such subscription services may include paid subscription services and/or non-paid subscription services.

Agencies having a particular interest in a region may provide third party sensors if additional data for that interest is desired. The use of laptop with access to online data storage and server, for example, facilitates back up and access to the data by both law enforcement and the pre-approved external agencies. The approval of external agencies can be made by the law enforcement agency. For example, the pre-approved agencies which are non-law enforcement agencies may be approved as part of a paid or unpaid subscription service agreement. The law enforcement agency 108 will ensure that the communication system 100 is compliant with the applicable security standards, so as to protect sensitive data and while allowing access to data that can be shared with pre-approved external agencies. The notification sent to the pre-approved external agency may be configurable to ensure that only permitted data is shared. The notification may be configured, for example, to include information specific to the pre-approved external agency and permitted to be shared by the law enforcement agency. The external pre-approved agencies may include, but are not limited to, pre-approved agencies comprising one or more of: insurance agencies, water management agency, animal protective services agency, vehicle repossession-agency, and environmental agency.

Operationally, the sensor data acquired by the water body surveillance apparatus 102 is received at the wireless communication device 106 and from the wireless communication device is stored to the database 112 (i.e. sensor data storage of unknown objects) and the data is further transferred from the database to the computer server 110 (i.e. perform machine learning and analytics is performed on the sensor data). Analytic results from the computer server 110 are stored in the database 112 for example confirming object identification. Additional input, from the wireless communication device, for example under the control of a dive team user or other user, can input and confirm object identification the object from portable to the server. Hence, the database can be built up with object identification information over various searches being performed over the same and/or various bodies of water over time.

The various sensor data also provides further characterization of the water body environment, which facilitates optimization and automation of future navigational instructions. For example, the wireless communication device, (laptop, tablet, radio), may prompt and enable autonomous searching by the water body surveillance apparatus 102 using automated instructions derived from the machine learning acquired from previous search results. Hence, the user interaction with the wireless communication device 114 can become increasingly simplified as a water body is characterized over various searches. For example, downed trees, coral and rock formations may be mapped, within database 112, as part of a water body characterization and deemed to be objects to be avoided during the search (other than for location purposes), while vehicles, body remains (human and/or animal), batteries and tires may be mapped as objects of interest. The database 112 may further map agency information to different objects of interest. For example, an object identified as a vehicle may be further mapped to one or more automotive insurance agencies. Objects identified as tires and/or batteries may be mapped to an environmental agency and/or water management agency. Objects identified as non-human, animal remains may be mapped to a pre-approved animal protective services agency, while human remains would be limited to access by only the law enforcement agency (or other pre-approved external law enforcement agencies, such as the FBI).

The table below provides examples of such mapping:

| Object of Interest | Law Enforcement Alert | Additional Non-Law Enforcement Pre-Approved External Agency Notification |
|---|---|---|
| Vehicle | yes | Insurance Agency |
| Vehicle | yes | Bank/Repossession-service |
| Body Remains Animal | yes | Animal Protective Services |
| Body Remains Human | yes | [null] |
| Toxic Debris (e.g. Tires, Batteries) | yes | Environmental Agency Water management Agency |

The object/agency mapping may be stored within database 112 and utilized as a basis for current and future dispatch of one or more dive teams responding to a real-time incident. The mapping facilitates the ability of the dive team to further target potential objects of interest for further characterization and documentation. The mapping further facilitates the ability of a dive team to target a geographic location associated with the match for further review, characterization and documentation. Periodic scans of a zone of the water body can be performed during one survey or multiple surveys over time to build up the database. Depending on the type of object detected (e.g. human remains), the dissemination of information to pre-approved external agencies may be filtered, or temporarily delayed, by the law enforcement agency, to ensure investigative protocols.

Figure 2:
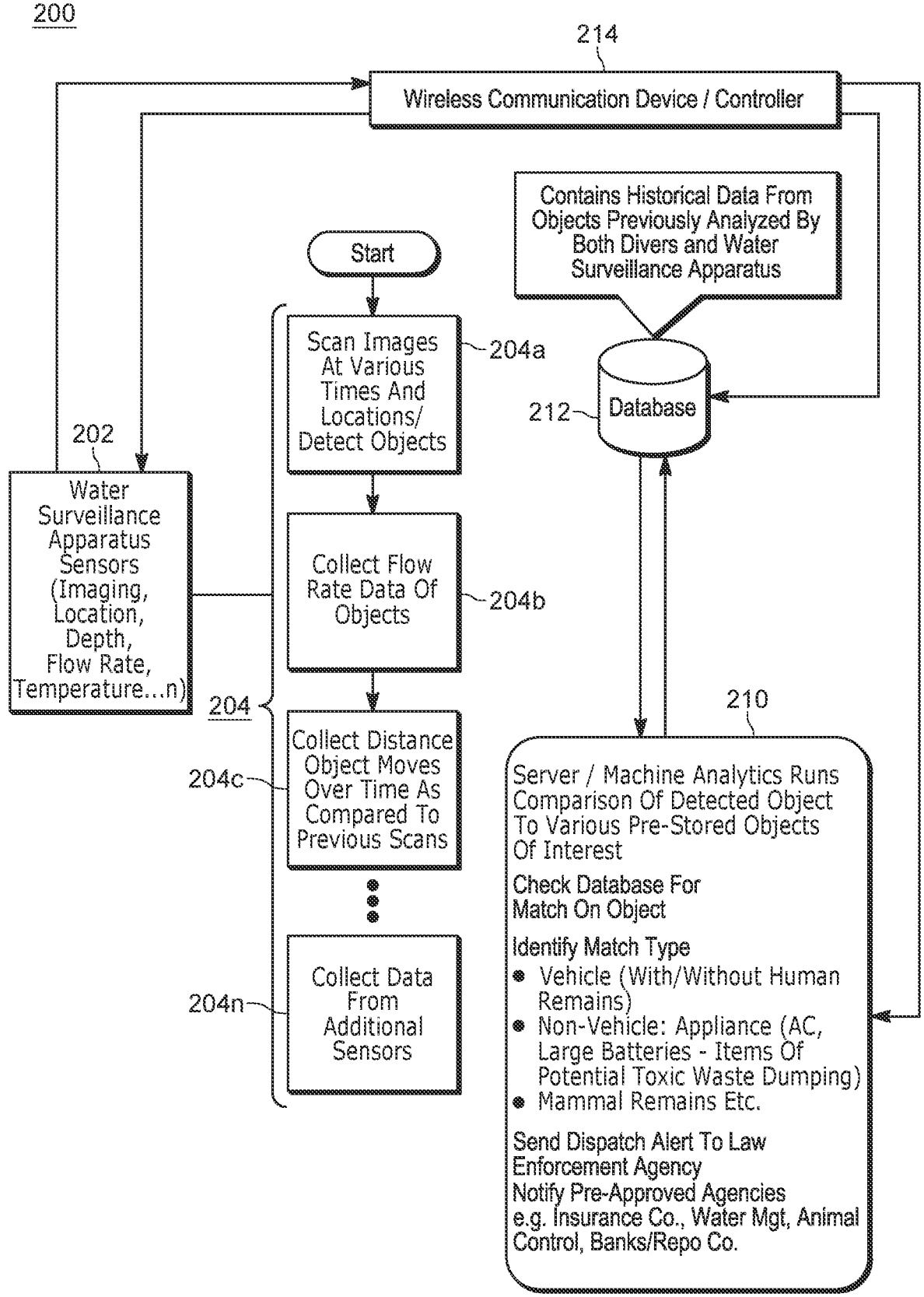
FIG. 2 is an example functional block diagram of the communication system of FIG. 1 in accordance with some embodiments.

FIG. 2 is an example functional block diagram 200 of the communication system of FIG. 1 in accordance with some embodiments. In this figure, water body surveillance apparatus 202 represents any of the water body surveillance apparatus 102, collected sensor data 204a-204n represent examples of sensor data collected by sensors 116, 118, computer server 210 represents the computer server 110, database 212 represents the database 112, and wireless communication device 214 represents the wireless communication device 114. The various functions described are intended as examples and not intended to limit the scope of the communication system.

The collected sensor data 204a, 204b, 204c, ... 204n may include one or more of: image data from scanned images at various times and locations 204a, flow rate data pertaining to an object 204b, distance/movement data of an object over time 204c, as well as additional sensor data 204n, for example sonar data, magnetic sensor data, radar data, and other sensor data.

The water body surveillance apparatus may have the sensors organized in groups, such as a first group of sensors operational above water for collecting above water data; and a second group of sensor operational below water to capture below water data. The first group of sensors and second group of sensors may periodically scan zones assigned by the controller of the wireless communication device 214 to detect objects above and below the water body surface. The sensor data collected from the first and second group of sensors can be used to estimate object location, shape and/or volume. Estimated object location, shape, and volume may be relayed to the server for comparison to pre-stored locations, shapes and volumes associated with objects of interest stored within the database 212. The database 212 contains historical data from objects previously analyzed by both the water surveillance apparatus and dive team inputs to the wireless communication device. The computer server 210 may further transfer analytical results pertaining to the estimated object location, object shape, and object volume to the database 212 for future comparisons.

In some embodiments, the processor of the computer server 210 utilizes data analytics to compare the latest detected object data to past sensor data scans and makes a determination that the object in the previous scan is the same object found in the latest scan and calculates a velocity of the object based on a difference in location of the object found in the two scans divided by respective times of the scans. The computer server 210, for example using flow rate sensor data, computes a difference in the velocity of the object and the flow rate of the water and further uses the computed difference to estimate a frictional force impeding the object. The server may then estimate the object weight and/or density based on the estimated frictional force on the object. The server then processes the data by comparing the object's estimated shape, volume, weight, and density to a list of pre-stored known characteristics for known objects stored within the database 212, and identifies the object based on pre-stored known characteristics stored within the database. In accordance with some embodiments, the pre-stored known object characteristics stored in the database 212 are collected from previous sensor data pertaining to detected objects and input from dive teams confirming object identification.

Periodic controlled scanning by the sensors allows the server processor to iteratively improve its machine learning algorithm for improved comparison and matching. The periodic controlled scanning further improves the server's ability to provide optimized and automated navigational instructions to the portable communication device 214. For example, during subsequent surveys of a zone during a search, the sensors will detect an object previously detected, and relay collected data to the server via the wireless communication device. During a subsequent survey of a zone during a separate search, the sensors detect and the server identifies a similar object to a previously detected object, to identify potential patterns of object dumping. For example, illegal dumping of car batteries in a lake may be identified as taking place within certain time periods of the year. Subsequent searches can be set up to periodically survey the same zone looking for that particular object of interest (e.g. car batteries). Navigational search patterns of the two surveys can be compared to determine if certain navigational patterns of the water surveillance apparatus are optimal for detecting a particular object. For example, a navigational pattern to approach an identified object of interest (e.g. car batteries) so as to provide optimal lighting for a particular time of day can be learned by computer sever 210, stored in database 212, and transferred to the wireless communication device 214 and applied to new searches looking for particular objects of interest. The navigational patterns may be initially configured and optimized for objects of particular interest to a law enforcement agency and may be further configured for additional search patterns optimized to obtain additional object information of interest to pre-approved external agencies. For example, an object identified as a vehicle, which is of interest to law enforcement, may also be of interest to an insurance agency, and a navigational pattern may be optimized to obtain additional sensor data, such as an image scan of a license plate and VIN number of the vehicle. If such data is not obtainable, or if additional data is desired, then various navigational patterns may also be optimized to obtain sensor data at different angles and sides of a vehicle to determine vehicle make, model, and approximate year of the vehicle. The optimized search patterns may be configurable, selectable, and/or automated. For example, a search pattern for a law enforcement search may be completed first, followed by a search pattern for a pre-approved external agency to focus on aspects of particular interest to that external agency, for example, based on types of object detected during the first search pattern.

Figure 3:
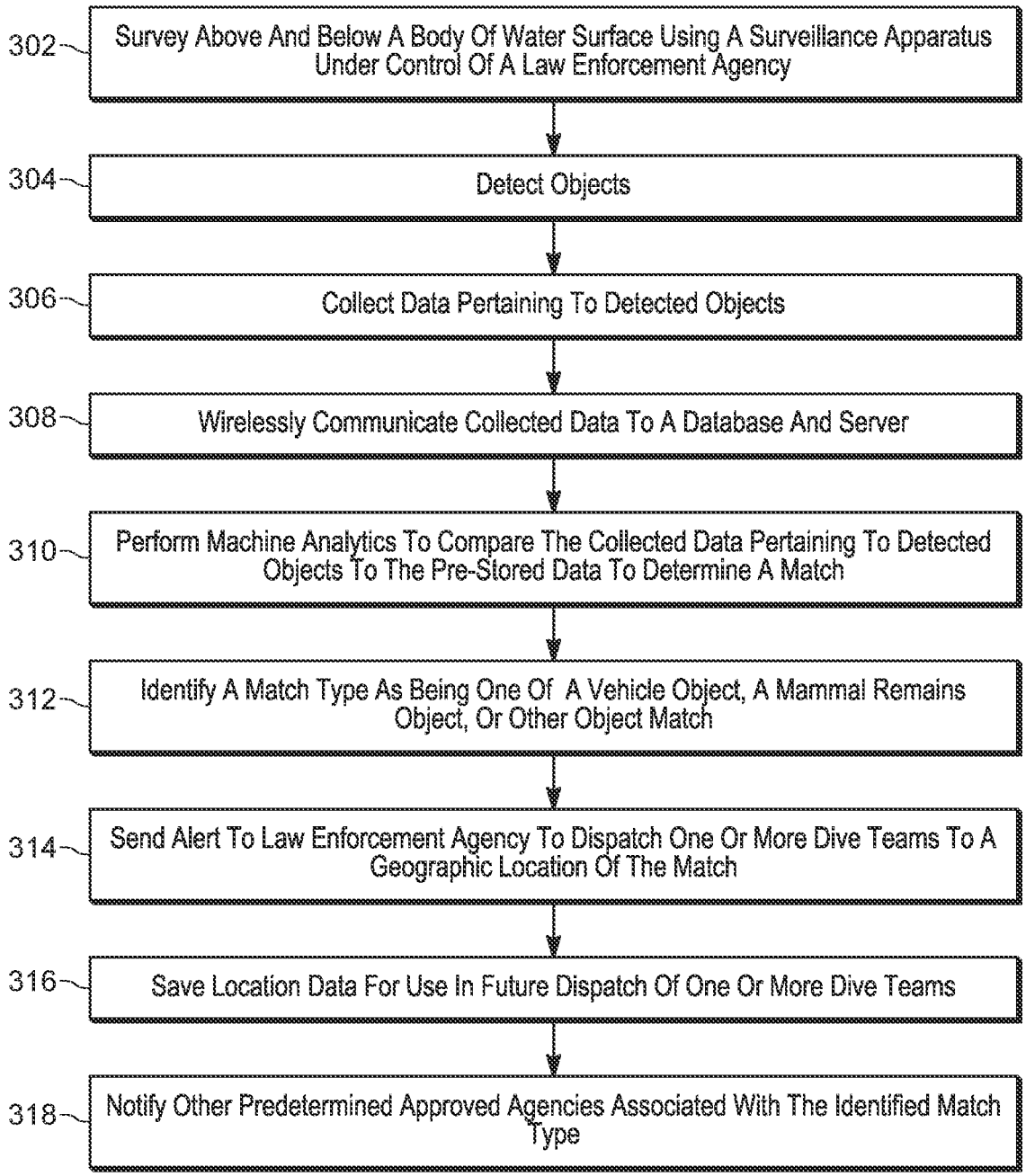
FIG. 3 is a flowchart for a method for conducting a waterway search using the communication system of FIG. 1 in accordance with some embodiments.

FIG. 3 is a flowchart of a method 300 for conducting a waterway search using the communication system of FIG. 1 in accordance with some embodiments. The method begins at 302 by surveying, using the water surveillance apparatus, above and below a water body surface to detect objects at 304, and collect sensor data pertaining to the detected objects at 306, the water surveillance apparatus being under control of a wireless communication device of a law enforcement agency. At 308 the method continues by wirelessly communicating the collected data from the water surveillance apparatus to the wireless communication device and from the wireless communication device to a database for storage and server for analytics. The database may includes pre-stored data pertaining to objects of interest acquired from previous surveys and input from divers, such as input confirming or differentiating object identification to improve machine learning and analytics. Machine learning can be used to build up a database of object types, based on size, shape, and other object characterizes. Analytics are performed, by the server, at 310 to compare the collected data pertaining to the detected object to the pre-stored data of the database to determine a match.

In some embodiments, performing data analytics may include various server processes such as comparing the latest detected object data to past surveys and making a determination that the object in the previous survey is the same object found in the latest survey. Calculations pertaining to a velocity of the object can be made based on a difference in location of the object found in the two surveys divided by the time. A frictional force impeding the object can be computed based on a difference in the velocity of the object and the flow rate of the water. The computed frictional force the object can be used to estimate the object weight and density.

The method continues at 312 with identifying, by the server, a match type as being one of a vehicle object, a body remains object, or other object of interest match associated with pre-approved external agencies. The pre-approved external agency's contact information is stored in the database and may include one or more of: other law enforcement agencies and non-law enforcement agencies.

In response to the match type being a vehicle, body (human and/or animal) remains match, the server proceeds to send an alert to the law enforcement agency to dispatch one or more dive teams to a geographic location of the match at 314. The location data is saved at 316, within the database, for use in future dispatch of one or more dive teams. In response to the match type being an object of interest match, the server sends an alert to the law enforcement agency and further notifies a pre-approved external agency associated with the object of interest match at 318.

In some embodiments, the pre-approved external agency may be notified as part of a subscription service agreement. Non-law enforcement type agencies, such as insurance companies and banks may be provided access to the matched objects of interest based on a paid subscription service, while other public safety type agencies might be provided with free subscription services, such as animal protection agencies and environmental agencies. The subscription service is configurable and controlled by the law enforcement agency to provide access to legitimate parties of interest.

In some embodiments, and upon dispatch of a dive team for a real-time emergency (such as a reported drowning, man overboard, or missing persons), the pre-stored data may be referenced to find nearby "other object matches" that have not yet been investigated by a human yet (for, e.g., additional information that may be valuable to law enforcement or other external agencies). Accordingly, and in some optional embodiments, the method 300 may further include detecting a real-time emergency dispatch of a dive team, identifying the location that the dive team has been dispatched to, accessing the pre-stored data to identify objects of interest identified by the water body surveillance apparatus 102 and/or server 110 but not yet further investigated by a dive team (and, e.g., not important enough to dispatch a real-time dive team at step 314) that are within a threshold distance of the dispatched location, and add the identified objects of interest to the tasks to be performed by the dive team dispatched to the real-time emergency (e.g., to allow the real-time dive team to complete additional tasks as determined via access to the pre-stored data). Additional data retrieved by the dive team and electronically provided back to the server 110 and associated with particular objects of interest may be further processed by the server 110 and similar follow-up notifications provided to any one or more subscribed external agencies that were already notified regarding the objects of interest (based on the initially determined type of the object). In some embodiments, the additional data may further characterize or correct a mischaracterized prior characterization of an object of interest, in which case a first notification to any one or more subscribed external agencies may be provided at the time the additional data is received by the server 110. The threshold distance may be, for example, 100-2,000 feet, or 100-500 feet, and may include a step of predicting further movement of the objects of interest relative to the threshold distance based on past movements and/or water body flow rates, among other possibilities. Objects of interest within the database 112 may be tagged with a manual review indicator indicative of whether the object has been manually reviewed by a dive team yet or not. In some embodiments, only those objects of interest from database 112 that have not yet been manually reviewed (via the electronic indicator) are returned and suggested to be added (via a computing device user interface accessible to a dispatcher or dive team member) or directly electronically added as tasks to the real-time dive team task list (similarly accessible via a computing device user interface accessible to a dispatcher or dive team member). Other examples and distances are possible as well.

Accordingly, there has been provided a system and method that improves water surveillance searching of a body of water for particular objects as well as the expansion of the search to include objects of interest to notify approved external non-law enforcement agencies. Law enforcement divers can thus improve the effectiveness of each dive search to objects of interest to both law enforcement and pre-approved external agencies. The system and method further beneficially provides for predictive analytics of potential dumping activity and optimization of navigational patterns for law enforcement and pre-approved external agencies.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot provide electronic underwater object detection and identification with coordinated and automated alerts and notifications to law enforcement agencies and pre-approved external agencies based on object match type among other features and functions set forth herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication system for water body electronic surveillance, comprising:
   a water body surveillance apparatus for surveying above and below a water body surface to detect objects and collect sensor data pertaining to the detected objects the water body surveillance apparatus being under control of a law enforcement agency wireless communication device;
   a computer server for wirelessly communicating with the wireless communication device;
   a database operatively coupled to the computer server, the database having pre-stored data stored therein pertaining to objects of interest obtained from past collected sensor data pertaining to past detected objects and input from dive teams confirming object identification; and
   the computer server having a processor configured to:
      perform machine analytics to compare the collected sensor data pertaining to the detected objects to the pre-stored data to determine a match;
      identify a match type as being one of a vehicle object, body remains, or other external agency object of interest match associated with pre-approved external agencies outside of the law enforcement agency, wherein the match type is identified based on a comparison of the collected sensor data pertaining to a current detected object matching past collected sensor data of a past detected object having confirmed object identification, wherein the comparison is performed by the processor of the server being configured to:
         compare a latest detected object data to past sensor data scans and make a determination that the object in a previous scan is the same object found in the latest scan; calculate a velocity of the object based on a difference in location of the object found in the previous scan and latest scan divided by time;
         compute a difference in velocity of the object and flow rate of the water and uses the computed difference to estimate a frictional force impeding the object;
         estimate object weight and density based on the estimated frictional force on the object; and
         compare the estimated object shape, object volume, object weight, and density to a list of pre-stored known characteristics for known objects stored within the database;
      in response to the match type being a vehicle and/or body remains match, send an alert to the law enforcement agency to dispatch one or more dive teams to a geographic location of the match or to save the location for use in future dispatch of one or more dive teams; and
      in response to the match type being an external agency object of interest match, send alert to the law enforcement agency and further send a notification to a pre-approved external agency associated with the object of interest match.

2. The communication system of claim 1, wherein the pre-approved external agencies are stored in the database and comprise one or more of:
   other law enforcement agencies different from the law enforcement agency; and
   non-law enforcement agencies.

3. The communication system of claim 2, wherein the pre-approved external agencies which are non-law enforcement agencies are notified as part of a subscription service agreement.

4. The communication system of claim 2, wherein the pre-approved external agencies which are non-law enforcement agencies are notified as part of a paid subscription service agreement.

5. The communication system of claim 1, wherein the notification sent to the pre-approved external agency is configurable.

6. The communication system of claim 5, wherein the notification is configured to include information specific to the pre-approved external agency.

7. The communication system of claim 1, wherein the pre-approved external agencies comprise one or more of:
   an insurance agency;
   a water management agency;
   animal protective services agency;
   repossession agency; and
   environmental agency.

8. The communication system of claim 1, wherein in response to the match type being body remains comprising non-human animal remains, the notification is sent to a pre-approved animal protective services agency.

9. The communication system of claim 1, wherein in response to the match type being a stolen vehicle match, the notification is sent to a pre-approved insurance agency.

10. The communication system of claim 1, wherein the water body surveillance apparatus comprises:
    a first group of sensors operational above water for collecting above water data; and
    a second group of sensor operational below water to capture below water data.

11. The communication system of claim 10, wherein:
    the first group of sensors and second group of sensors periodically scan zones assigned by the controller to detect objects above and below the water body surface and gather sensor data to estimate object location, object shape and object volume; and
    the sensor data being stored in the database for future comparison.

12. The communication system of claim 1, wherein:
    during a subsequent survey of a zone during a search, the sensors detect the object previously detected, and relay collected data to the server via the wireless communication device.

13. The communication system of claim 1, wherein:
    during a subsequent survey of a zone during a separate search, the sensors detect and the server identifies a similar object to a previously detected object, to identify potential patterns of object dumping.

14. The communication system of claim 1, wherein the water body surveillance apparatus comprises a drone having above water sensors and below water sensors.

15. The communication system of claim 1, wherein the water body surveillance apparatus comprises a boat having above water sensors and below water sensors.

16. The communication system of claim 1, the processor further configured to:

detect a real-time dispatch of a dive team to a real-time emergency at a first body of water location;

access the pre-stored data to identify a nearby list of one or more objects of interest within a threshold distance of the first body of water location that have not yet been manually reviewed by a dive team; and one of (i) provide a suggestion to one of a dispatch device associated with a dive team dispatcher and an electronic computing device associated with a dive team member to add the identified nearby list of objects of interest as targets for review and additional characterization and feedback, and (ii) electronically add the identified nearby list of objects of interest to an electronic task list associated with the dive team as targets for review and additional characterization and feedback.

* * * * *